United States Patent [19]
Desimone et al.

[11] 3,886,215
[45] May 27, 1975

[54] PROCESS USING METAL SALT-AMINE COMPLEX CATALYSTS FOR THE PREPARATION OF ALPHA BETA-ETHYLENIC KETONES SUCH AS DELTA-CIS-PSEUDO IONONES

[75] Inventors: Robert S. Desimone, Willingboro; Peter S. Gradeff, Andover, both of N.J.

[73] Assignee: Rhodia, Inc., New York, N.Y.

[22] Filed: Feb. 1, 1973

[21] Appl. No.: 328,559

[52] U.S. Cl. ....... 260/586 C; 260/593 R; 260/632 R
[51] Int. Cl. ............................................. C07c 45/00
[58] Field of Search ............ 260/587, 593 R, 586 R, 260/586 C

[56] References Cited
UNITED STATES PATENTS

| | | | |
|---|---|---|---|
| 3,029,287 | 4/1962 | Riehen et al. | 260/587 |
| 3,456,015 | 7/1969 | Riehen et al. | 260/593 R |
| 3,574,715 | 4/1971 | Riehen et al. | 260/593 R |

FOREIGN PATENTS OR APPLICATIONS

| | | | |
|---|---|---|---|
| 666,786 | 7/1963 | Canada | 260/593 R |

Primary Examiner—Bernard Helfin
Assistant Examiner—James H. Reamer

[57] ABSTRACT

A process is provided for the preparation of $\alpha$, $\beta$-ethylenic ketones by the condensation of aliphatic and cycloaliphatic tertiary acetylenic carbinols and especially for the preparation of $\Delta^3$-cis-pseudo ionones by the condensation of dehydrolinalool and derivatives thereof with isoalkenyl ethers in the presence of metal salt-amine complex catalysts. The $\Delta^3$-cis-pseudo ionones can be cyclized to produce the corresponding $\alpha$-, $\beta$-, and $\gamma$-cis-ionones or alkyl ionones. Methods are also described for rearranging the $\Delta^3$-cis-pseudo ionones to the normally encountered trans-pseudo ionones which in turn can be converted to the trans-ionones.

25 Claims, No Drawings

PROCESS USING METAL SALT-AMINE COMPLEX CATALYSTS FOR THE PREPARATION OF ALPHA BETA-ETHYLENIC KETONES SUCH AS DELTA-CIS-PSEUDO IONONES

Ionones occupy a prominent place in perfumery. It would be hard today to find a perfume composition that does not contain an ionone. More than one hundred ionones are known; the most widely used ones are β-ionone, α-ionone, the methyl ionones, and the irones. β-ionone also is a principal intermediate in the preparation of synthetic Vitamin A.

The importance of the ionones is reflected in the efforts reported in the literature to find suitable ways for their manufacture. All of the commercial methods start from citral or dehydrolinalool, and proceed via the pseudo ionones to the ionones. For example, citral is condensed with acetone or methyl ethyl ketone, and the pseudo ionone cyclized to ionone. Dehydrolinalool is reacted with ethyl acetoacetate by Carroll's synthesis to pseudo ionone, followed by cyclization. Condensation of citral with 2-ethoxy-propene yields the triethoxy derivative of pseudo ionone which leads to the pseudo ionone (U.S. Pat. No. 3,109,861, dated Nov. 5, 1963, to Guex, Marbet and Montavon). Pseudo ionone also is prepared from dehydrolinalool and methyl acetoacetate or diketene. The rearrangement of dehydrolinalool acetate to enol acetate of citral followed by reaction with acetone and the rearrangement of the allenic ketone formed by condensation of a ketal or an enol ether and dehydrolinalool (U.S. Pat. No. 3,029,287, dated Apr. 10, 1962, to Marbet and Saucy) both yield pseudo ionone.

β-Ionone, for instance, is obtained by cyclization of pseudo ionone under the influence of acid:

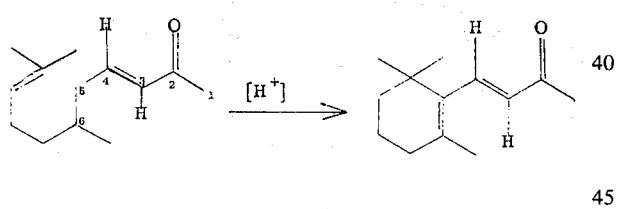

One should notice that in the case of both β-ionone and pseudo ionone, the configuration of the Δ³ double bond conjugated to the carbonyl is trans. This is the normal form. The cis-Δ³ configuration of pseudo ionone has been postulated as theoretically possible, but not favored, and unstable. In fact, efforts to prepare the cis-isomer have all failed (*J. Chem. Soc.* 1965 5528). Two cis-isomers are possible, depending on the configuration at the Δ⁵ double bond:

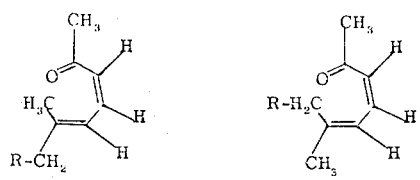

Cis-Δ³, Trans-Δ⁵       Cis-Δ³, Cis-Δ⁵

R=(CH₃)₂-C=CH-CH₂-

Although the cis-pseudo ionone has not been prepared, cis-β-ionone can be prepared by another route, from trimethyl-2,6,6-cyclohexanone, which is reacted with acetylene to form trimethyl-ethynyl-cyclohexanol, followed by a Grignard reaction, as shown below:

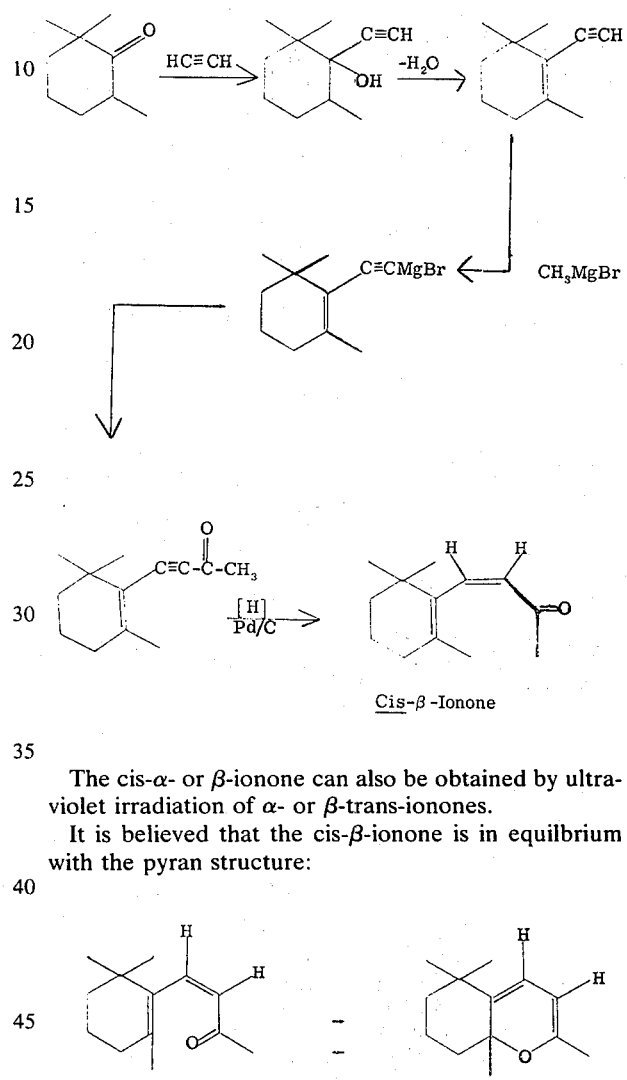

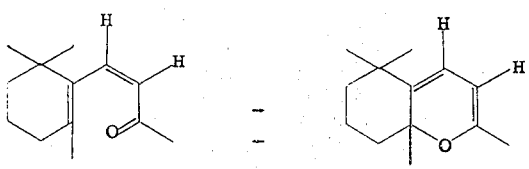

Cis-β-Ionone

The cis-α- or β-ionone can also be obtained by ultraviolet irradiation of α- or β-trans-ionones.

It is believed that the cis-β-ionone is in equilbrium with the pyran structure:

This is discussed in an article published in *J. Am. Chem. Soc.* 88 619-20 (1966). Most recently, Martell et al. (*J. Org. Chem.* 37 2992, (1972)) have also demonstrated that Δ³-cis ionone exists in equilibrium with the pyran form. The preparation of cis-α-ionone from the trans-iomer by irradiation is described by Buchi and Wang in *Helv. Chem. Acta* 160 1339 (1955). However, since the cis-β-ionone apparently also is present in the open chain structure at least to some extent, and the equilibrium is such that the mixture behaves as though it were all in the open chain structure, it is unnecessary to consider the pyran structure in the specification and claims of this application, and it will not be referred to further.

It has now been discovered that the cis-Δ³-pseudo ionones, compounds previously unknown and considered to be too unstable to exist, can be prepared from dehydrolinalool and its homologues by reaction with alkoxy propenes or butenes in the presence of a metal salt-amine complex as a catalyst at a temperature within the range from about 80° to about 150°C. Furthermore, it appears that of the two possible cis-$\Delta^3$-isomers, cis-$\Delta^3$-cis-$\Delta^5$, and cis-$\Delta^3$-trans-$\Delta^5$, only one is present, and interpretation of some analytical data points to the cis-$\Delta^3$-trans-$\Delta^5$ isomer.

It is quite surprising that the cis-$\Delta^3$ isomer is obtained in this process, since all other known processes (such as that of U.S. Pat. No. 3,029,287) starting from dehydrolinalool and its homologues lead to the trans-$\Delta^3$-pseudo ionones. It appears that the metal salt-amine complex is primarily responsible for this remarkable result, and the metal salt-amine complex also makes possible the obtention of the cis-$\Delta^3$-isomer in a one step process.

The cis-$\Delta^3$-pseudo ionone can be converted to the cis-ionone which exists in equilibrium with the $\alpha$-pyran form, and this can be isomerized to the trans-ionone. The cis-$\Delta^3$-pseudo ionone can also be isomerized to the trans-$\Delta^3$-pseudo ionone, and this can be converted to the trans-ionone.

Accordingly, in the process of the instant invention, one of the class of dehydrolinalool and its derivatives thereof is reacted with an isoalkenyl ether at a temperature within the range from about 80° to about 150°C. in the presence of a metal salt-amine complex to produce the corresponding $\Delta^3$-cis pseudo-ionone or $\Delta^3$-cis-pseudo methyl ionone. The isoalkenyl group of the ether has from three to four carbon atoms, and the class includes isopropenyl and isobutenyl lower alkyl ethers. The substituent groups of the dehydrolinalool include alkyl, alkenyl, cycloalkyl and cycloalkenyl, the alkyl and alkenyl groups having from one to about thirty carbon atoms, and the cycloalkyl and cycloalkenyl having from three to about thirty carbon atoms. The lower alkyl and alkenyl homologues, the alkyl having from one to four carbon atoms, and the alkenyl from two to four carbon atoms, are preferred. While some trans-$\Delta^3$-isomer may be obtained, the cis-$\Delta^3$-isomer is produced in predominant proportion.

The cis-$\Delta^3$-pseudo ionones offer a convenient and direct route for preparation of the corresponding cis-ionones and cis-methyl ionones.

The cis-$\Delta^3$-pseudo ionones can be isomerized to the trans-$\Delta^3$-isomers, which lead to the corresponding known ionones and methyl ionones.

The process of the invention is applicable to any tertiary acetylenic carbinol having the general formula:

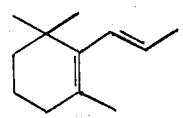

wherein:

a. R' is selected from the group consisting of:

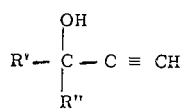

wherein $R_1$, $R_2$ and $R_3$ are selected from the group consisting of hydrogen, lower alkyl and lower alkenyl, having from one to about four carbon atoms;

(ii)

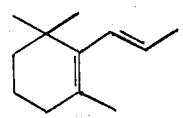

(iii)

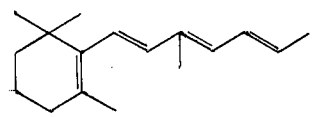

(iv)

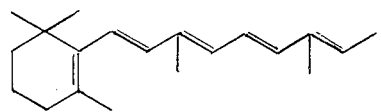

b. R'' is selected from the group consisting of lower alkyl and lower alkenyl, having from one to about four carbon atoms.

In the case where the isoalkenyl ether is an isopropenyl ether, the condensation reaction of the invention proceeds as represented by Scheme I to produce an $\alpha$, $\beta$-ethylenic ketone:

SCHEME I

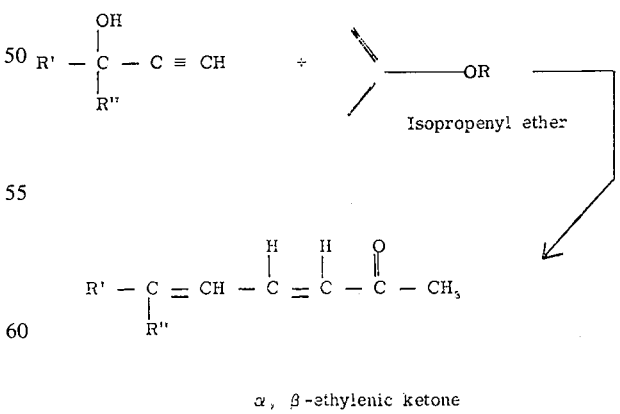

$\alpha$, $\beta$-ethylenic ketone

When the isoalkenyl ether is an isobutenyl or higher alkenyl ether, the condensation reaction proceeds as shown in Scheme II, to produce two or more isomeric $\alpha$, $\beta$-ethylenic ketones:

SCHEME II

R and R$_5$ = lower alkyl having from one to four carbon atoms

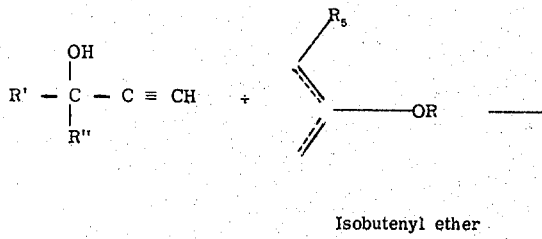

Isobutenyl ether

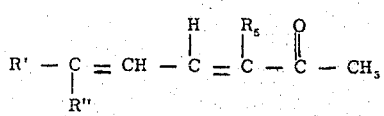

α, β-ethylenic ketone I

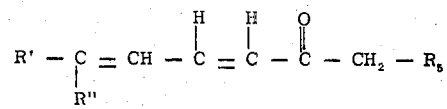

α, β-ethylenic ketone II

The class of tertiary acetylenic alcohols having a dehydrolinalool structure is an example. The dehydrolinalools to which the process of the invention is applicable have the general formula:

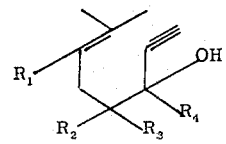

wherein R$_1$, R$_2$, R$_3$ and R$_4$ are selected from the group consisting of lower alkyl and lower alkenyl, as indicated above, having up to about four carbon atoms.

In the case where the isoalkenyl ether is an isopropenyl ether, the application to the class of dehydrolinalools of the reactions of the invention results in a cis-Δ$^3$-pseudo ionone, and can be represented by Scheme III:

SCHEME III

R = lower alkyl having from one to four carbon atoms

Reaction (a) - Condensation

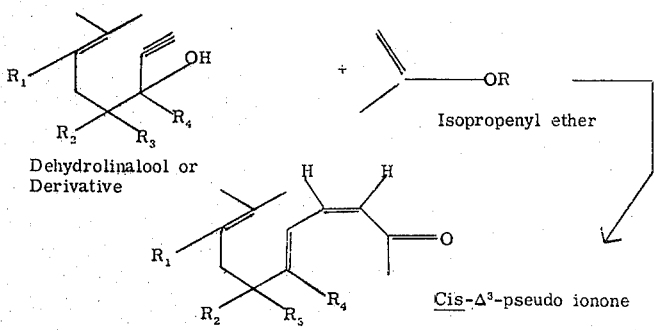

Dehydrolinalool or Derivative

Isopropenyl ether

Cis-Δ$^3$-pseudo ionone

Reaction (b) - Isomerization

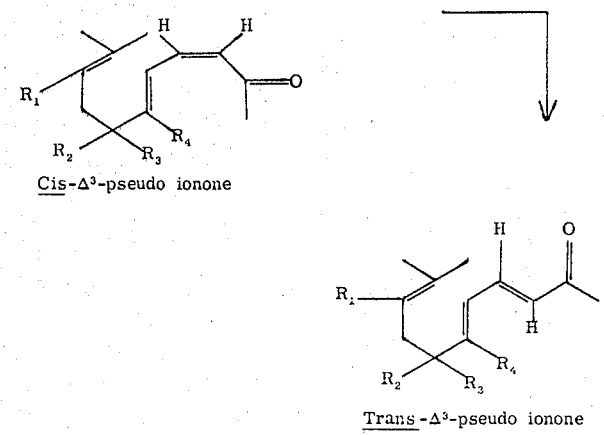

Cis-Δ$^3$-pseudo ionone

Trans-Δ$^3$-pseudo ionone

Scheme III — Continued

Reaction (c) - Cyclization

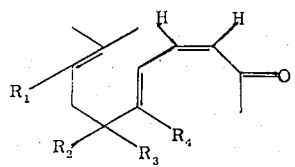

Cis-Δ³-pseudo ionone

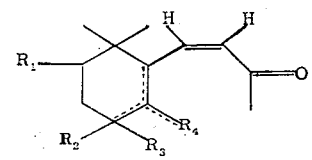

Cis (α-, β-, γ-) ionone

When the isoalkenyl ether is an isobutenyl or higher alkenyl ether, the application to the class of dehydrolinalools of the reactions of the invention results in two or more isomeric cis-Δ³-pseudo ionones, and can be represented by Scheme IV:

SCHEME IV

R and $R_5$ = lower alkyl having from one to four carbon atoms

Reaction (a) - Condensation

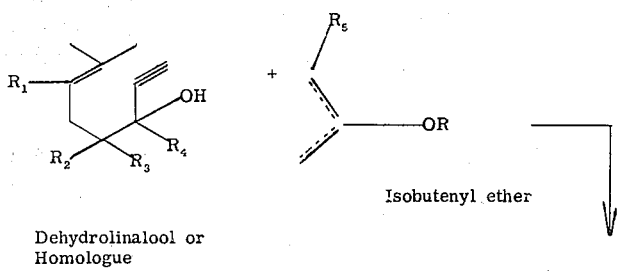

Dehydrolinalool or Homologue

Isobutenyl ether

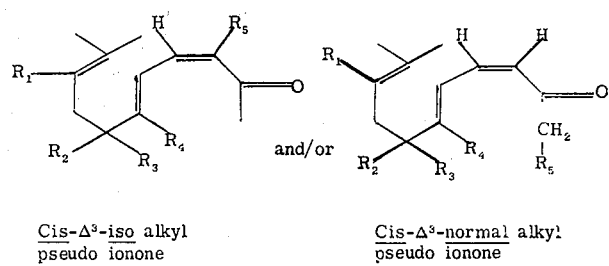

Cis-Δ³-iso alkyl pseudo ionone

Cis-Δ³-normal alkyl pseudo ionone

Reaction (b) - Isomerization to trans-Δ³-isomer

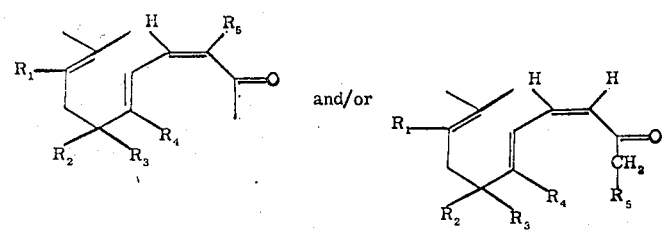

Cis-Δ³-iso alkyl pseudo ionone

Cis-Δ³-normal alkyl pseudo ionone

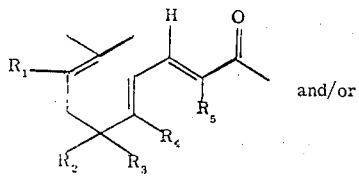
Iso alkyl pseudo ionone

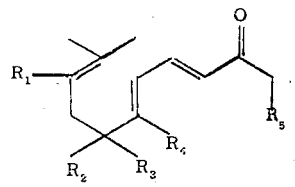
Normal alkyl pseudo ionone

Reaction (c) - Cyclization

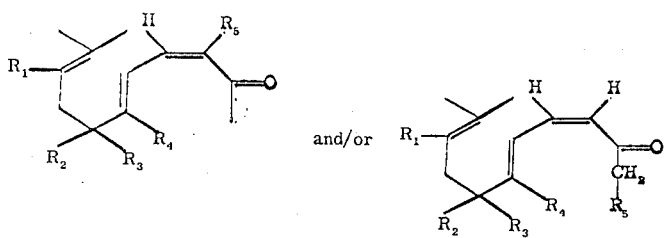

Cis-Δ³-iso alkyl pseudo ionone    Cis-Δ³-normal alkyl pseudo ionone

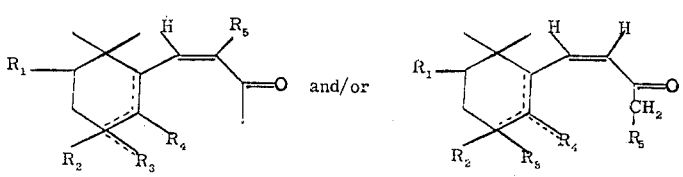

Cis-iso alkyl ionone    Cis-normal alkyl ionone

While the process in accordance with the invention is operative with lower isoalkenyl ethers in which $R_5$ is higher than methyl, such as ethyl, propyl, and isobutyl, the process is of major commercial interest when $R_5$ is methyl.

The terms "cis-Δ³-pseudo ionone," "cis-Δ³-iso alkyl pseudo ionone" and "cis-Δ³-normal alkyl pseudo ionone" are used generically herein to refer to compounds of the formulae represented above. Likewise, the terms "cis-ionone" and "cis-alkyl ionone" are used generically to refer to cis-ionones of the formulae represented above. However, it will be apparent that isopropenyl ethers produce pseudo ionones, and that isobutenyl ethers produce cis-Δ³-alkyl pseudo ionones. The cis-alkyl-pseudo ionones exist in iso and normal forms. Upon cyclization, both pseudo ionones and alkyl pseudo ionones produce mixtures of cis-α-, β-, and γ-ionones and cis-alkyl ionones.

It will of course be understood that when $R_2$ and $R_3$ are both lower alkyl, the α-ionone isomers do not exist.

During the coupling of the isoalkenyl ether with the tertiary acetylenic carbinol, the R substituent of the isoalkenyl ether is converted to the corresponding alcohol which is normally trapped by the excess of isoalkenyl ether.

When $R_1$, $R_2$, and $R_3$ are hydrogen and $R_4$ is methyl, the acetylenic alcohol is dehydrolinalool. Condensation of dehydrolinalool with an isopropenyl ether produces cis-Δ³-pseudo ionone, and the condensation of dehydrolinalool with isobutenyl ethers produces cis-Δ³-methyl pseudo ionone in both iso and normal forms.

Derivatives and homologues of dehydrolinalool in like manner give the corresponding ionones and cis-Δ³-methyl pseudo ionones in iso and normal forms.

The process of the invention is applicable, for instance, to the following tertiary acetylenic carbinols:

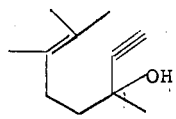
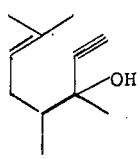
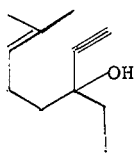
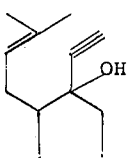
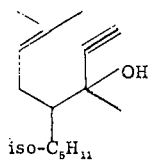
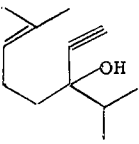
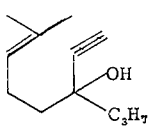
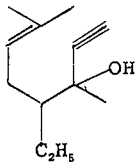
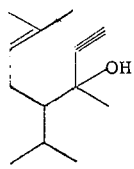
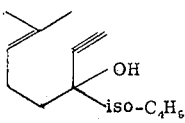

These lead to preparation of the following exemplary cis-α-ionones, when an isopropenyl ether is used as a reagent, in Scheme I:

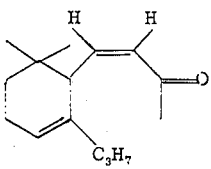
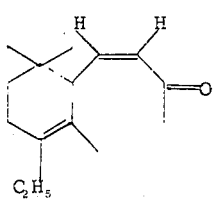
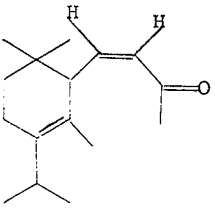
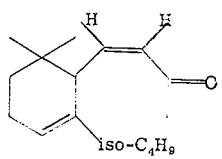

In the case when $R_2$ and $R_3$ are both alkyl, for instance,

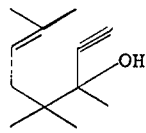

the corresponding cis-ionones are only β- and γ-:

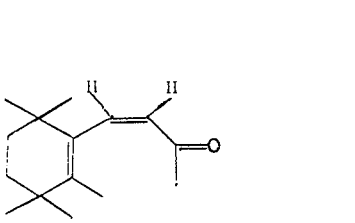

and

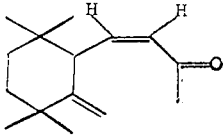

These lead to preparation of the following exemplary cis-iso-methyl-α-ionones, when the corresponding isobutenyl ether is used as a reagent, in Scheme II:

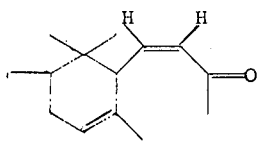
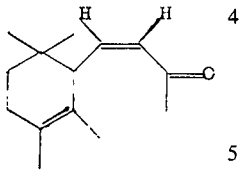
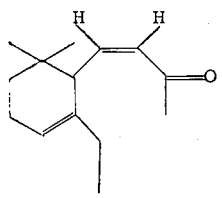
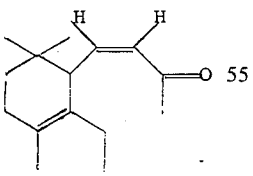
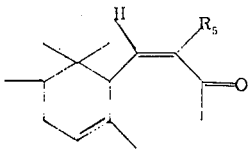
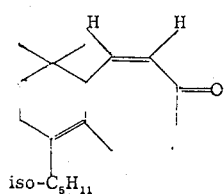
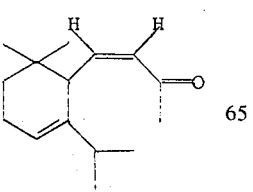
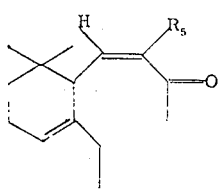
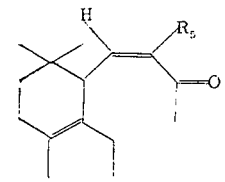

—Continued

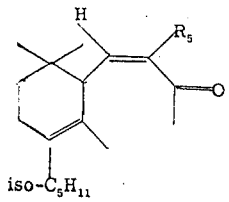

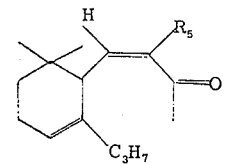

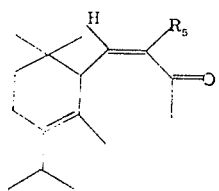

The process of the invention is also applicable, for instance, to the following cases:

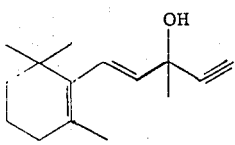

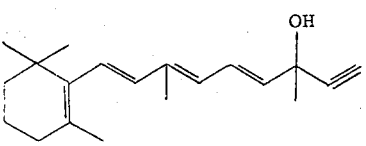

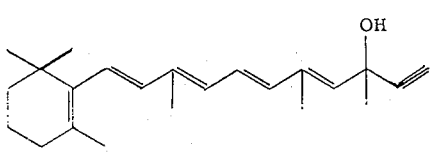

The reaction in accordance with the invention proceeds in the presence of a metal amine complex, which acts as a catalyst in this reaction.

The metal salt-amine complex has an unknown structure, but can be defined by the empirical formula:

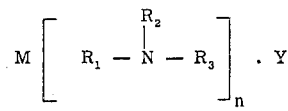

wherein:
a. MY is the metal salt, which is capable of complexing with amines, M representing the metal and Y the anion of the salt. Exemplary salts are those of copper, chromium and silver.

b. $R_1$, $R_2$ and $R_3$ are selected from the group consisting of:
  i. monovalent hydrocarbon groups having from one to about thirty carbon atoms (in which case the compounds are aliphatic hydrocarbon amines);
  ii. bivalent hydrocarbon groups (two of $R_1$, $R_2$ and $R_3$ being taken together to form a cyclic ring) which may include hetero atoms such as nitrogen, oxygen, and sulfur, as in morpholine and thiazole (in which case the compounds are cycloaliphatic hydrocarbon amines, monocarbocyclic aromatic amines, and heterocyclic amines);
  iii. trivalent hydrocarbon groups (the three $R_1$, $R_2$ and $R_3$ being taken together), as in pyridine;
  iv. hydrogen.

c. n is the number of amine groups in the complex and is within the range from about 0.01 to about 50, preferably from 1 to 6, and is not necessarily representative of a molar relationship.

It will be understood that the number of metal ions M and anions Y in the metal salt is balanced according to the valence of each.

Exemplary amines are methyl amine, butyl amine, decyl amine, diethyl amine, dipropyl amine, dibutyl amine, dioctyl amine, aniline, p-toluidine, m-toluidine, trimethylamine, triethylamine, ethyl dimethylamine, decyl dipropyl amine, N-methyl aniline, cyclohexyl amine, cyclopentylamine, methyl cyclohexyl amine, morpholine, pyridine, pyrazine, piperidine, pyrimidine, quinoline, isoquinoline, thiazole, triazole, oxazole, and pyrrole.

The catalyst is prepared by reaction of the amine with a compound of the metal. The liquid amine can serve as the reaction medium. Water can also be added to dissolve the metal compound, if it is water-soluble. A lower aliphatic alcohol can also serve as a solvent.

Any metal salts can be used. The effective available salts are usually those in which the anion Y is chloride, bromide, iodide, nitrate, sulfate.

The effectiveness of the metal amine-salt complex is surprising, since the amine alone has no catalytic effect, and neither do most of the metal salts. Even if the metal salt has some catalytic effect, such as copper sulfate, the effect can be enhanced greatly by the amine.

The amount of the amine is in no way critical, and is not stoichiometric, although a complex is definitely present. This apparently is due to the fact that excess metal salt or amine that may not be complexed and may exist as the metal salt or amine may be present. Hence, the catalyst can contain an amount of nitrogen within the range from about 1 to about 30%. For optimum effect, however, a molar proportion where $n$ is 1 to 4 is preferred.

The amount of catalyst can be rather small. An amount as low as 1% is effective, but better results are obtained with amounts within the range from about 2% to about 5%. While larger amounts than 5% can be used, up to approximately 10% there seems to be no advantage commensurate with the larger amount of catalyst employed.

The reaction time is normally within the range from about 0.2 hour to about 3 days, depending upon the reagents, the degree of agitation, temperature and the amount of catalyst present. Usually, the reaction is complete within about 2 to about 40 hours.

The reaction temperature is also quite critical. The reaction proceeds at temperatures from about 80° to about 150°C., preferably from 85° to 120°C. At temperatures below 80°C., the reaction does not proceed at a measurably practical rate. At temperatures in excess of 125°C., only the trans-$\Delta^3$-isomer is produced, and side reactions tend to reduce the yield even of the trans-isomer.

Because of the low boiling point of the isoalkenyl ether, the reaction is carried out in a closed vessel, so as to retain the isoalkenyl ether within the reaction mixture. Good agitation is desirable.

Surprisingly, the reaction proceeds better and in a higher yield in the absence of a solvent. In the presence of a solvent, even in as small an amount as 5% by weight of the reagents (dehydrolinalool and isoalkenyl ether), some reaction takes place, but the yield is reduced.

Thus, the catalyst seems to require a high concentration of the reagents. Effectiveness is markedly reduced when the reagents are diluted by an external solvent, even in small amounts.

The cis-$\Delta^3$-pseudo ionone after isolation from the reaction mixture can be cyclized to the ionone or alkyl ionone using an acidic cyclizing reagent. This reaction is conventional, and proceeds in the usual manner, under normal operating conditions, using conventional acids, for example, phosphoric acid in the presence of a suitable solvent, and heating, or a sulfuric acid-acetic acid mixture at low temperature.

It is also possible to isomerize the cis-$\Delta^3$-pseudo ionone to the corresponding trans-$\Delta^3$-pseudo ionone by irradiation with ultraviolet light or by treatment with an isomerizing reagent, such as iodine. The isomerization can also be accomplished upon heating for extended periods. The isomerization takes place at room temperature, although elevated temperatures up to about 150°C. can be employed. Very small amounts of reagent are effective. As little as 0.2% reagent can be used. Isomerization is complete when amounts within the range from about 0.2 to 0.4% reagent is used. Amounts in excess of this, up to about 10%, can be employed, but no advantage appears to be obtained in doing so.

A preferred isomerizing reagent is an elemental halogen, such as bromine or iodine. Iodine is best used in solution in an inert solvent for iodine, such as isopropyl ether or ethyl ether, to facilitate contact with the cis-pseudo ionone or alkyl pseudo ionone.

In general, any acid or base or acidic or basic salt can be used as the isomerizing reagent, to effect isomerization of cis-$\Delta^3$ to trans-$\Delta^3$-pseudo ionone; acids include sulfonic acids such as paratoluene sulfonic acid, and octane sulfonic acid; carboxylic acids such as formic acid, acetic acid, trichloroacetic acid and propionic acid; inorganic acids such as nitric acid, phosphoric acid, sulfuric acid, and hydrochloric acid; and Lewis acids, such as $BF_3$. Bases include sodium hydroxide, potassium hydroxide, and ammonium hydroxide, and silver nitrate is an example of a salt.

Isomerization also can be effected by irradiation with ultraviolet light. The isomerization proceeds at room temperature under such irradiation and in a relatively short time, from 0.2 hour up to 10 hours.

Heating at an elevated temperature within the range from about 50° to about 150°C. can also isomerize the cis-$\Delta^3$- to trans-$\Delta^3$-pseudo ionone. Heating is sufficient by itself, although addition of an isomerizing reagent or irradiation with ultraviolet light may expedite the isomerization reaction.

By direct cyclization of the cis-$\Delta^3$-pseudo ionone with strong acids, a mixture containing large amounts of cis-($\beta$-, $\beta$-, and $\gamma$-) ionone can be obtained. The cis-($\alpha$-, $\beta$-, and $\gamma$-) ionones have quite distinct olfactory characteristics, different from trans-$\alpha$-, $\beta$-, and $\gamma$-ionones, and are useful as perfume agents.

The following Examples in the opinion of the inventors represent preferred embodiments of the invention:

EXAMPLE 1

Anhydrous cupric sulfate (6.0 grams) was dissolved in water and 27.7 grams of quinoline was added, with immediate formation of a light green precipitate. Methanol (100 ml) was then added, the slurry filtered, the filter cake washed with methanol, and the light green solid allowed to air dry. Analysis of the solid showed 17.6% Cu, 6.81% S, 48.99% carbon, 3.81% hydrogen, and 6.50% nitrogen.

Dehydrolinalool (15.2 grams, 0.1 mol) and 2-methoxy propene (21.6 grams, 0.3 mol) were combined in a pressureresisting bottle with 0.3 gram of the above catalyst. A magnetic stirring bar was added, and the bottle closed and immersed in an oil bath, heated to 90°C. for 4.2 hours, The resulting oily mixture was washed with water. The low boiling fraction was distilled to 60°C. at 44 mm Hg, and the remaining brown oil flash-distilled at 40° to 220°C. head temperature, 1.2 to 1.5 mm Hg, to give 1.1 grams of residue and 17.9 grams of distillate.

The distillate contained 0.48 grams of recovered dehydrolinalool, 15.0 grams of cis-$\Delta^3$-pseudo ionone, and 1.0 grams of trans-$\Delta^3$-pseudo ionone.

EXAMPLE 2

Into a flask containing 3.0 grams of anhydrous copper sulfate was added 30 grams of diethylamine with stirring. After stirring the mixture four days at room temperature, the solids were filtered, washed with ethyl acetate and air-dried to give a blue powder. Analysis of the powder showed 8.15% H, 33.07% C, 9.41% N, and 25.9% Cu.

Dehydrolinalool (15.2 grams, 0.1 mol) and 2-methoxy-propene (21.6 grams, 0.3 mol) were combined in a pressureresisting glass bottle with 0.3 gram of the above catalyst, a magnetic stirring bar was added, and the bottle closed and immersed in an oil bath heated at 90°C. for 3.75 hours. The brown essentially homogeneous mixture was washed with water. The low boiling fraction was removed under aspirator vacuum, and the remaining oil was flash-distilled at a head temperature of 40° to 174°C., pot temperature 80° to 200°C., 1.0 mm Hg, to give 14.9 grams of distillate and 4.3 grams of residue.

The distillate contained 0.8 gram of recovered dehydrolinalool, 3.8 grams of cis-$\Delta^3$-pseudo ionone, and 5.3 grams of trans-$\Delta^3$-pseudo ionone.

EXAMPLE 3

Triethylamine (30 grams) and 3.0 grams of anhydrous cupric sulfate were combined in a pressure vessel, and a magnetic stirring bar added. The slurry was stirred at 90°C. for 21.5 hours, whereupon the light green solids were filtered, and the filter cake washed with ethyl acetate prior to air drying. The catalyst showed 3.14% nitrogen, 15.42% carbon, and 4.44% hydrogen on analysis.

Dehydrolinalool (15.2 grams, 0.1 mol) and 2-methoxy propene (21.6 grams, 0.3 mol) were combined in a pressure bottle with 0.3 grams of the above catalyst, a magnetic stirring bar was added, and the bottle closed and immersed in an oil bath with stirring for 2.5 hours at 90°C. The essentially homogeneous reaction mixture was cooled, and washed with water. The low boiling fraction was removed under aspirator vacuum, and the remaining oil flash-distilled at 40° to 135°C. head temperature, 80° to 190° C. pot temperature, 1.1 to 1.5 mm Hg, to give 18.5 grams distillate and 0.7 gram of residue.

The distillate contained 1.7 gram of recovered dehydrolinalool, and 15.72 g of condensation product. The direct yield was 82.0%, and the true yield was 92.4%.

EXAMPLE 4

Copper sulfate (6.0 grams) was dissolved in water and 16.8 grams of pyridine was added dropwise, with agitation and cooling. After the addition was complete, the mixture was stirred for 1 hour, and ethanol added. The sky-blue precipitate was filtered, washed with ethanol, and air dried to a constant weight. Elemental analysis showed 10.35% nitrogen, 33.68% carbon, 3.97% hydrogen, and 17.9% copper.

Dehydrolinalool (15.2 grams, 0.1 mol) and 2-methoxy propene (21.6 grams, 0.3 mol) were combined in a pressureresisting glass bottle with 0.3 gram of the above catalyst, a magnetic stirring bar was added, and the bottle closed and immersed in an oil bath with stirring for 17.5 hours at 90°C. The essentially homogeneous reaction mixture was cooled and washed with water. The low boiling fraction was removed under aspirator vacuum, and the remaining oil flash-distilled at 75° to 142°C. head temperature, 125° to 163°C. pot temperature, 0.5 to 3.9 mm Hg, to give 18.2 grams of distillate and 1.6 gram of residue.

The distillate contained 0.8 gram of recovered dehydrolinalool, 12.1 gram of cis-$\Delta^3$-pseudo ionone, and 3.2 grams trans-$\Delta^3$-pseudo ionone.

EXAMPLE 5

To 6.0 grams of cupric sulfate dissolved in water was added 16.8 grams of pyridine, dropwise with agitation, and the resulting mixture allowed to stir for one hour at ambient temperature. The light blue solid was filtered, washed with ethyl acetate and air dried overnight. Elemental analysis showed 4.55% nitrogen, 20.86% carbon, 2.75% hydrogen, while wet analysis showed 25.6% Cu, and 6.3% water.

Dehydrolinalool (15.2 grams, 0.1 mol) and 2-methoxy propene (21.6 grams, 0.3 mol) were combined in a pressure bottle with 0.3 grams of the above catalyst, a magnetic stirring bar was added, and the bottle closed and immersed in an oil bath with stirring for 1 hour and 50 minutes at 90°C. The essentially homogeneous reaction mixture was cooled, and washed with water. The low boiling fraction was removed under aspirator vacuum, and the remaining oil flash-distilled at 30° to 121°C. head temperature, 100° to 160°C. pot temperature, 0.6 to 1.1 mm Hg, to give 16.0 grams of distillate and 5.7 grams of residue.

The distillate contained 6.7 grams of cis-$\Delta^3$-ionone and 5.6 grams of trans-$\Delta^3$pseudo ionone.

EXAMPLE 6

To 4.0 grams of Cr(NO$_3$)$_3$·9H$_2$O in 50 ml of hot methanol was added 4.8 grams of pyridine. The dark blue solution was placed under 30 mm Hg vacuum for 68 hours at room temperature, to give 4.9 grams of gun-grey crystals. Elemental analysis showed 13.40% nitrogen, 41.88% carbon, 3.62% hydrogen and 8.14% chromium.

Dehydrolinalool (15.2 grams) was combined with 21.4 grams of 2-methoxy propene and 0.3 grams of the above catalyst in a glass-lined pressure vessel. A magnetic stirring bar was added, and the mixture stirred at 90°C. for 2 hours, at which time the salmon-brown mixture was filtered, washed with water, and vacuum evaporated at 40 mm Hg 60°C. Flash distillation of the remaining brown oil at 53° to 154°C. head temperature, 70° to 190°C. pot temperature, gave 14.9 grams of distillate and 0.7 grams of residue at 0.8 mm Hg.

Gas-liquid chromatographic analysis of the distillate showed 6.12 grams of recovered dehydrolinalool, 6.85 grams of cis-$\Delta^3$-pseudo ionone, and 1.49 grams of trans-$\Delta^3$-pseudo ionone.

EXAMPLE 7

To 4.0 grams of CR(NO$_3$)$_3$·9H$_2$O dissolved in 50 ml of hot methanol was added 4.8 grams of pyridine. The dark blue solution was placed under 40 mm Hg for 68 hours at room temperature to give 4.9 grams of gun-grey crystals. Elemental analysis showed 13.40% nitrogen, 41.88% carbon, 3.62% hydrogen and 8.14% chromium.

Dehydrolinalool (15.2 grams) was combined with 21.4 grams of 2-methoxy propene and 0.3 gram of the above catalyst in a glass-lined pressure vessel. A magnetic stirring bar was added, and the mixture stirred at 90°C. for 18 hours, after which the mixture was filtered, washed with H$_2$O, and vacuum-evaporated at 40 mm Hg, 60°C. Flash distillation of the remaining brown oil at 54° to 135°C. vapor temperature, 65° to 200°C. pot temperature, 0.8 mm Hg, afforded 16.6 grams of distillate and 0.6 gram of residue. Gas-liquid chromatographic analysis of the distillate showed 8.03 grams of recovered dehydrolinalool, and 8.22 grams of condensation product.

EXAMPLE 8

To 6.0 grams of cupric sulfate dissolved in 20 ml of water was added 20 grams of aniline, dropwise with stirring. The resulting yellow solid was filtered, washed quickly with methanol, and air dried to constant weight. Elemental analysis showed the catalyst to contain 7.62% nitrogen, 3.92% hydrogen, 41.59% carbon, while wet analysis showed 18.4% copper.

Dehydrolinalool (15.2 grams) was combined with 21.4 grams of 2-methoxy propene and 0.3 gram of the above catalyst in a glass-lined pressure vessel. A magnetic stirring bar was added, and the mixture heated at 90°C. with stirring for 4.8 hours. The reaction mixture was cooled, washed three times with equal volumes of water ($H_2O$ washes cross-extracted with cyclohexane), and the combined organic phases dried over sodium sulfate prior to vacuum stripping of solvent. Flash distillation at 0.4 to 1.0 mm Hg, 50° to 150°C. head temperature, and 85° to 200°C. pot temperature, gave 17.3 grams of distillate and 2.5 grams of residue.

The distillate contained 0.42 gram of dehydrolinalool, 10.8 grams of cis-$\Delta^3$-pseudo ionone and 3.8 grams of trans-$\Delta^3$-pseudo ionone.

EXAMPLE 9

To 3.6 grams of cupric chloride dissolved in 20 ml of water was added 16.8 of pyridine, dropwise with agitation, with immediate formation of a blue color. Methanol was added to precipitate the complex, which was filtered, washed three times with methanol, and air dried to a light blue powder. The catalyst was found to contain 13.40% nitrogen, 41.88% carbon, 3.62% hydrogen, and 23.2% copper, upon elemental analysis.

Dehydrolinalool (15.2 grams) was combined with 21.6 grams of 2-methoxy propene and 0.3 gram of the above catalyst. A magnetic stirring bar was added, and the mixture stirred at 90°C. for 54.5 hours at which time the essentially homogeneous brown solution was cooled, and washed three times with equal volumes of water. The water washes were cross-extracted with cyclohexane, and the combined organic phases dried over sodium sulfate, and the solvent removed under aspirator vacuum. Flash distillation of the remaining brown oil at 0.8 mm Hg, 50° to 124°C. head temperature, 57° to 140°C. pot temperature, gave 15.5 grams of distillate and 2.7 grams of residue.

Gas chromatographic analysis of the distillate showed 11.1 grams dehydrolinalool, 1.74 gram cis-$\Delta^3$-pseudo ionone, and 0.12 gram trans-$\Delta^3$-pseudo ionone.

EXAMPLE 10

A solution of 3.0 grams of $CuSeO_4$ in 5 ml of hot water was combined with 8 ml of methanol, at which point a precipitate was obtained. Pyridine (4.8 grams) was then added, with heating to obtain a dark blue solution, to which was added, in succession, 200 mls of methanol, and 500 mls of acetone. The resulting flocculent pale blue precipitate was filtered, and washed with methanol and then ether prior to air drying overnight, yielding a pale aqua blue powder. The powder showed 5.82% nitrogen, 25.80% carbon, 2.94% hydrogen, and 20.4% copper on elemental analysis.

Dehydrolinalool (15.2 grams) was combined with 21.4 grams of 2-methoxy propene and 0.3 gram of the above catalyst. A magnetic stirring bar was added, and the mixture heated with stirring for 49.5 hours at 90°C. The mixture was cooled, washed with water (cross extracted with cyclohexane) and dried over sodium sulfate prior to removal of low boilers under aspirator vacuum. The resulting oil was flash-distilled at 0.8 mm Hg, 50° to 181°C. head temperature, 56° to 220°C. pot temperature, to yield 13.0 grams of distillate and 1.4 gram of residue.

The distillate by gas-liquid chromatographic analysis was found to contain 11.0 grams of dehydrolinalool, 0.94 gram of cis-$\Delta^3$-pseudo ionone, and 0.27 gram of trans-$\Delta^3$-pseudo ionone. The direct yield was 6.6%, and the true yield 23.0%.

EXAMPLE 11

To 6.5 grams of $Cu(NO_3)_2 \cdot 3H_2O$ in 20 ml of methanol was added 16.8 grams of pyridine. The resulting deep violet blue precipitate was washed with methanol, and air dried overnight. Elemental analysis showed 11.66% copper, 16.75% nitrogen, 4.13% hydrogen, and 47.87% carbon.

Dehydrolinalool (15.2 grams) was combined with 21.4 grams of methoxy propene and 0.3 gram of the above catalyst in a glass-lined pressure vessel. A magnetic stirring bar was added, and the mixture stirred at 90°C. for 3.2 hours. After cooling, the turbid brown solution was washed with water (cross-extracted with cyclohexane) and dried over sodium sulfate prior to removal of low boilers under aspirator vacuum. Flash distillation as in Example 10 gave 17.6 grams of distillate and 1.5 gram of residue.

The distillate by gas-liquid chromatographic analysis was found to contain 4.47 grams of dehydrolinalool, 11.16 grams of cis-$\Delta^3$-pseudo ionone, and 1.33 gram of trans-$\Delta^3$-pseudo ionone.

EXAMPLE 12

To 3.6 grams of cupric chloride dissolved in 20 ml of water was added 16.8 grams of pyridine, dropwise with stirring. The resulting blue solution was combined with methanol, to precipitate a blue solid, which was filtered, washed three times with methanol and air dried to a constant weight. The light blue powder was shown to contain 23.2% copper, 13.40% nitrogen, 41.88% carbon, and 3.62% hydrogen upon elemental analysis.

Dehydrolinalool (15.2 grams) was combined with 21.4 grams of 2-methoxy propene and 0.3 gram of the above catalyst in a pressure-resisting glass-lined vessel. A magnetic stirring bar was added, and the mixture stirred at 120°C. for 28.3 hours. The turbid dark brown solution was washed with water, dried over $Na_2SO_4$ and flash-distilled at 53° to 198°C. head temperature, 68° to 212°C. pot temperature, 0.8 mm Hg, to give 15.6 grams of distillate and 0.8 gram of residue.

The distillate contained 11.8 grams of dehydrolinalool, 1.56 gram of cis-$\Delta^3$-pseudo ionone and 0.14 gram of trans-$\Delta^3$-pseudo ionone.

EXAMPLE 13

To 3.0 grams of $Cu(BF_4)_2$ in 15 ml of hot methanol was added 9.6 grams of pyridine. Upon cooling, a precipitate was obtained, which was washed with methanol, then with ether and air dried to give 1.7 gram of a violet micro-crystalline powder. The catalyst contained 10.8% copper, 10.07% nitrogen, 3.75% boron, 43.30% carbon and 3.79% hydrogen, upon elemental analysis.

Dehydrolinalool (15.2 grams) was combined with 21.4 grams of 2-methoxy propene and 0.3 gram of the above catalyst in a glass-lined pressure-resisting vessel. A magnetic stirring bar was added, and the mixture heated at 90°C. with stirring for 19.8 hours. The resulting turbid dark brown mixture was filtered, washed with water (cyclohexane used to cross extract and rinse) and low boilers removed under aspirator vacuum. Flash distillation at 40° to 150°C. head temperature, 60° to 190°C. pot temperature, 0.5 mm Hg gave 19.2 grams of distillate and 1.8 gram of residue.

Gas-liquid chromatographic analysis showed the distillate to contain 11.46 grams of dehydrolinalool and 2.63 grams of condensation product.

EXAMPLE 14

To 6.0 grams of $AgNO_3$ in 10 ml of water was added 22.4 grams of pyridine, dropwise with stirring. The resulting clear solution was placed under 40 mm vacuum over a three-day period, to give white crystals. The crystals were washed with ethyl acetate, and air dried to a constant weight, 11 grams. Elemental analysis of the crystals showed 26.67% Ag, 36.15% C, 12.94% N, and 2.99% H.

Dehydrolinalool (15.2 grams) was combined with 21.4 grams of 2-methoxy propene and 0.3 gram of the above catalyst in a pressure-resisting glass-lined vessel. A magnetic stirring bar was added, and the mixture heated at 90°C. with stirring for 16.1 hours. During the initial phase of heating, the reaction mixture was homogeneous. The resulting turbid, black mixture was filtered, washed with water and low boilers removed under aspirator vacuum. Flash distillation at 50° to 120°C. head temperature, 65° to 160°C. pot temperature and 0.5 to 0.2 mm Hg gave 15.8 grams of distillate and 1.0 gram of residue.

The distillate contained 11.04 grams of dehydrolinalool, and 5.3 grams of condensation product.

EXAMPLE 15

To 6.0 grams of $CuSO_4$ dissolved in water was added 16.8 grams of pyridine, dropwise with agitation, and cooling. After stirring for 1 hour, ethanol was added to precipitate the complex, which was filtered and washed with ethanol. Air drying gave 8.2 grams of a sky-blue powder, which showed 17.9% copper, 9.38% sulfur, 10.35% nitrogen, 3.97% hydrogen and 33.68% carbon, on elemental analysis.

Dehydrolinalool (15.2 grams) was combined with 21.4 grams of 2-methoxy-2-butene and 0.3 gram of the above catalyst in a pressure-resisting glass-lined vessel. A magnetic stirring bar was added, and the mixture stirred at 83° to 92°C. for 17 hours. After cooling, the resulting turbid, brown solution was filtered, washed with water (cross-extracted with cyclohexane) and low boilers removed under aspirator vacuum. Flash distillation of the remaining brown oil at 48° to 205°C. head temperature, 51° to 225°C. pot temperature and 0.8 mm Hg gave 13.5 grams of distillate and 1.2 gram of residue.

The distillate contained 3.77 grams of dehydrolinalool, and 4.77 grams of a mixture of 3-methyl-cis-$\Delta^3$pseudo ionone, 1-methyl-cis-$\Delta^3$pseudo ionone and mixed trans-$\Delta^3$-methyl pseudo ionones.

EXAMPLE 16

To 3.0 grams of pulverized $CuSO_4$ was added 30 grams of n-propylamine, and the mixture stirred at ambient temperature for 4 days. After filtration, the solids were washed with ethyl acetate and air dried to constant weight, to give 7.9 grams of dark blue crystals which contained 33.07% C, 9.41% N, and 8.15% H.

Dehydrolinalool (15.2 grams) was combined with 21.6 grams of 2-methoxy propene and 0.3 gram of the above catalyst in a pressure-resisting glass-lined vessel. A magnetic stirring bar was added, and the mixture stirred for 12.8 hours at 120°C. The dark brown turbid reaction mixture was filtered, washed with water, and the washings cross-extracted with cyclohexane. The combined organic phases were dried over sodium sulfate, and the low boilers removed under aspirator vacuum. Flash distillation of the remaining brown oil at 40° to 125°C. head temperature, 80° to 190°C. pot temperature, and 0.7 to 1 mm Hg, gave 15.2 grams of distillate and 1.5 gram of residue.

The distillate contained 8.4 grams of dehydrolinalool, 5.1 grams of cis-$\Delta^3$-pseudo ionone and 0.5 gram of trans-$\Delta^3$-pseudo ionones.

EXAMPLE 17

To 6.0 grams of cupric sulfate dissolved in 20 ml of water was added 20 grams of aniline, dropwise with stirring. The yellow solid was filtered, washed quickly with methanol, and air dried to constant weight. Elemental analysis showed the catalyst to contain 7.62% nitrogen, 3.92% hydrogen, and 41.59% carbon, while wet analysis showed 18.4% copper.

Dehydrolinalool (15.2 grams) was combined with 21.4 grams of 2-methoxy propene and 0.3 gram of the above catalyst in a glass-lined pressure vessel. A magnetic stirring bar was added, and the mixture heated at 90°C. with stirring for 4.8 hours. The reaction mixture was cooled, washed three times with equal volumes of water ($H_2O$ washes, cross-extracted with cyclohexane) and the combined organic phases dried over sodium sulfate prior to vacuum stripping of solvent. Flash distillation at 0.4 to 1.0 mm Hg, 50° to 150°C. head temperature and 85° to 200°C. pot temperature gave 18.9 grams of distillate and 1.2 gram of residue.

The distillate contained 0.3 gram of dehydrolinalool, 13.8 grams of cis-$\Delta^3$-pseudo ionone and 1.6 gram of trans-$\Delta^3$-pseudo ionone. An 87.2% direct yield and 88.9% true yield were obtained.

EXAMPLE 18

Cis-$\Delta^3$-Pseudo ionone was isomerized to trans-$\Delta^3$-pseudo ionone. The cis-$\Delta^3$-pseudo ionone (86.2% cis, 5.2% trans) 10 g, and 0.4 g of a 5% solution of iodine in isopropyl ether were mixed, and the mixture allowed to stand for 2.1 hours at room temperature. The isopropyl ether was then removed under aspirator suction, and the oil flash-distilled at 0.3 and 1 mm, head temperature 70° to 130°C., pot temperature 96° to 168°C., to give 9.2 g distillate and 0.8 g residue. Gas-liquid chromatographic analysis of the distillate, as compared to the starting material, showed nearly complete rearrangement of the cis-$\Delta^3$-pseudo ionone to trans-$\Delta^3$-pseudo ionone, as the following analysis shows:

|  | % By Weight | | | |
|---|---|---|---|---|
|  | Cis | Trans | Low Boilers | High Boilers |
| Initial Mixture | 86.2 | 5.2 | 7.9 | 1.1 |
| Distillate | 5.4 | 87.2 | 5.6 | 1.8 |

EXAMPLE 19

Cyclization of Cis-$\Delta^3$-Pseudo

Ionone to $\alpha$-Ionone

Into a three-necked 150 ml flask equipped with a mechanical stirrer, condenser, static nitrogen head and thermometer was charged 15 g of cis-$\Delta^3$-pseudo ionone (86.5% cis-$\Delta^3$-pseudo ionone, 5.8% trans-$\Delta^3$-pseudo ionone), 15 g of cyclohexane and 750 mg of 85% phosphoric acid. The mixture was heated to reflux (81 to 84°C.) for a total of 14 hours, and after cooling washed with water (200 ml) and saturated aqueous sodium bicarbonate (100 ml). The solution was then dried over $Na_2SO_4$, the solvent removed under aspirator vacuum and the remaining oil flash-distilled at 1.2 to 1.5 mm Hg, 66° to 110°C. head temperature, 87° to 160°C. pot temperature, to give 7.1 g of light yellow oil containing 10.5% cis-$\beta$-ionone, 2.4% cis-$\alpha$-ionone, 40.8% trans-$\alpha$-ionone and 12.8% trans-$\beta$-ionone.

EXAMPLE 20

A 5.0 g portion of cis-$\Delta^3$-pseudo ionone (86.2% cis-$\Delta^3$, 5.2% trans-$\Delta^3$) was isomerized to the trans-isomer by mixing with 0.1 g of a solution of 0.25 g $H_2SO_4$ in 5 g of methanol and allowing to stand at room temperature for 3 hours. The mixture was quenched in 40 ml of saturated sodium carbonate solution, and the organic phase taken up in benzene and washed with water. The organic phase was concentrated on aspirator vacuum and then flash-distilled at 0.2 to 0.5 mm Hg, 76° to 156°C. head temperature, 85° to 205°C. pot temperature, to give 0.5 g residue and 3.7 g distillate (9.3% cis-$\Delta^3$-, 86.6% trans-$\Delta^3$) corresponding to a direct yield of 68.3%, true yield 74.2%.

EXAMPLE 21

A one-gram portion of cis-$\Delta^3$-pseudo ionone (86.2% cis-$\Delta^3$, 5.2% trans-$\Delta^3$) was isomerized to the trans-isomer by mixing with 0.2 g of a solution of 0.25 g of para toluene sulfonic acid in 5 g of methanl, and allowing the homogeneous solution to stand at ambient temperature for 3 hours. Gas-liquid chromatographic analysis at the elapsed reaction times indicated showed the isomer distribution below:

| Elapsed Reaction Time (Hrs.) | Relative % Cis | Relative % Trans |
|---|---|---|
| 0 | 94.2 | 5.7 |
| 0.25 | 29.7 | 70.3 |
| 0.75 | 10.7 | 89.2 |
| 1.5 | 6.1 | 93.9 |

EXAMPLE 22

One g cis-$\Delta^3$-pseudo ionone was isomerized to the trans-isomer by heating with 1.5 g HOAc at 62° to 68°C. for 12.5 hours. Gas-liquid chromatographic analysis at the elapsed reaction times indicated showed the isomer distribution below:

| Elapsed Reaction Time (Hrs.) | Relative % Cis | Relative % Trans |
|---|---|---|
| 0 | 93.7 | 6.1 |
| 8.0 | 20.4 | 79.3 |
| 12.5 | 6.9 | 93.1 |

EXAMPLE 23

One g of 5,10-dimethyl-cis-$\Delta^3$-5,9-undecatrien-2-one was isomerized to the trans-isomer using 1 g of a solution of 1 g NaOH in 25 ml of MeOH. The mixture was allowed to stand at ambient temperature for 5.25 hours. Gas-liquid chromatographic analysis at the elapsed reaction times shown gave the isomer ratios:

| Elapsed Reaction Time (Hrs.) | Relative % Cis | Relative % Trans |
|---|---|---|
| 0 | 93.7 | 6.1 |
| (0.5 to 1.0 min.) | 45.7 | 54.3 |
| 0.88 | 18.8 | 81.2 |
| 5.25 | 7.4 | 92.6 |

EXAMPLE 24

One g of cis-$\Delta^3$-pseudo ionone was isomerized to the trans-isomer by mixing with 1 drop of $BF_3$ etherate and allowing to stand at ambient temperature for 22.3 hours. Gas-liquid chromatographic analysis of samples taken at the elapsed reaction times shown had the following isomer ratios:

| Elapsed Reaction Time (Hrs.) | Relative % Cis | Relative % Trans |
|---|---|---|
| 0 | 93.7 | 6.1 |
| 1.0 | 70.0 | 30.0 |
| 5.5 | 49.0 | 51.0 |
| 22.3 | 25.2 | 74.8 |

EXAMPLE 25

One g of cis-$\Delta^3$-pseudo ionone was isomerized to the trans-isomer using 1 g of a solution of 1 g $AgNO_3$, 4 g $H_2O$ and 25 ml MeOH. The mixture was allowed to stand at ambient temperature for 21.8 hours. Gas-liquid chromatographic analysis of samples taken at the elapsed reaction times shown below gave the isomer ratios:

| Elapsed Reaction Time (Hrs.) | Relative % Cis | Relative % Trans |
|---|---|---|
| 0 | 93.7 | 6.1 |
| 1.7 | 80.3 | 19.7 |
| 21.8 | 12.6 | 77.4 |

EXAMPLE 26

Isomerization of Cis-$\Delta^3$-Pseudo

Ionone to Trans-$\Delta^3$-Pseudo Ionone and Cyclization to $\beta$-Ionone

A. A 150.0 g portion of cis-$\Delta^3$-pseudo ionone (89.7% cis-$\Delta^3$, 2.0% trans-$\Delta^3$) was combined with 1.2 g of 5% iodine in isopropyl ether, and allowed to stand at ambient temperature for 50 minutes, at which point another 0.2 g of the iodine solution was added. After another 20 minutes, 0.2 g more of the iodine solution was added, and 20 minutes later the solvent was removed under aspirator vacuum.

B. Into a 100 ml flask equipped with a thermometer and magnetic stirrer was placed 52.5 g of 95% $H_2SO_4$ and 22.5 g of acetic acid. After cooling to a 12°C., the oil from step A was added dropwise, with stirring, over 1 hour at 10° to 18°C. The mixture was quenched 10 minutes after the addition was completed by pouring into 300 ml of H₂O and 50 ml of benzene, with stirring.

The organic phase was separated, and washed with 40 ml of saturated aqueous Na₂CO₃ solution in 100 ml of H₂O, and then with a 50 ml portion of water. The solvent was removed under aspirator vacuum, and the oil produce flash-distilled at 1 to 2 mm Hg, 65° to 142°C. head temperature, and 95° to 212°C. pot temperature, to give 11.9 g of distillate and 1.2 g of residue. The direct yield of β-ionone was 43.2%, true yield 67.7%. Gas-liquid chromatographic analysis showed:

| Components | Starting Material (%) | Distilled Product (%) |
|---|---|---|
| Dehydrolinalool | 2.0 | 0.7 |
| Cis-Δ³-pseudo ionone | 89.1 | Trace |
| Trans-Δ³-pseudo ionone | 2.0 | 41.7 |
| β-ionone | — | 49.5 |
| Unknown | 1.1 | 3.9 |

EXAMPLE 27

Isomerization of Cis-Δ³-Pseudo Ionone to Trans-Δ³-Pseudo Ionone and Cyclization to β-Ionone A 5.0 portion of cis-Δ³-pseudo ionone (83.7% cis-Δ³, 8.3% trans-Δ³) was treated with 0.5 g of acetic acid at 95° to 120°C. for 2.3 hours. A mixture of 17.5 g of 95% H₂SO₄ and 7 g acetic acid was cooled to 4°C. and the above oil in acetic acid added dropwise over 47 minutes, at a temperature range between 4° and 18°C., with stirring. The mixture was then poured into water and extracted with benzene. The benzene extracts were washed in succession with water, saturated aqueous sodium bicarbonate solution, and again water, prior to concentration under aspirator vacuum. Flash distillation of the remaining oil at 1.5 mm Hg, head temperature 30° to 122°C., pot temperature 92° to 185°C., gave 4.1 g of distillate containing 84.8% β-ionone. Yield 70%.

EXAMPLE 28

Into a metal pressure vessel equipped with a magnetic stirrer was combined 5.0 g of cis-pseudo ionone (77.4% Δ³-cis, 22.6% Δ³-trans) and 95.0 g of toluene. The mixture was heated at 150°C. for a total of 23.1 hours to give a mixture of 20.4% Δ³-cis-pseudo ionone and 79.5% Δ³-trans-pseudo ionone by gas-liquid chromatography.

EXAMPLE 29

To 3 g of Cu(BF₄)₂ in 14 ml hot methanol was added 12.1 g of triethylamine and the mixture stirred 18 hours at room temperature. The resulting precipitate was filtered and washed in succession with methanol and then ether. The solids were air dried to give 1.1 g of sky blue powder.

Dehydrolinalool (15.2 g) was combined with 21.4 g of 2-methoxy propene and 0.3 g of the above catalyst in a glass-lined pressure-resisting vessel. A magnetic stirring bar was added and the mixture heated at 90° with stirring for 17 hours. The brown turbid mixture was filtered and washed with water prior to removing lights under aspirator vacuum. Flash distillation of the remaining oil at 0.3 to 0.8 mm Hg, 35° to 130°C. head temperature, 60° to 180°C. pot temperature gave 17.2 g of distillate and 1.0 g of residue. The distillate as analyzed by gas-liquid chromatography container 11.1 g of dehydrolinalool, and 4.07 grams of condensation product.

Having regard to the foregoing disclosure, the following is claimed as the inventive and patentable embodiments thereof:

1. A process for preparing cis-Δ³-pseudo ionones and cis-Δ³-pseudo methyl ionones from dehydrolinalool and lower alkyl homologues thereof by condensation with an isopropenyl or isobutenyl lower alkyl ether, comprising condensing dehydrolinalool or a lower alkyl homologue thereof having the formula:

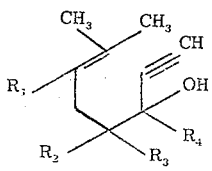

wherein $R_1$, $R_2$, $R_3$, and $R_4$ are hydrogen or lower alkyl having from one to about four carbon atoms and with an isopropenyl or isobutyl lower alkyl ether in the presence of a metal salt-amine complex catalyst of the formula:

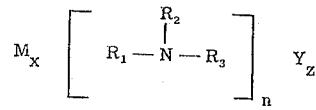

wherein M is a metal selected from the group consisting of copper, chromium and silver, Y is the anion of the salt and is selected from the group consisting of chloride, bromide, iodide, nitrate, and sulphate; $x$ and $z$ are integers selected according to the valence of M and Y, $n$ is a number within the range from about 0.01 to about 50, and

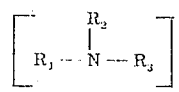

is selected from the group consisting of aliphatic hydrocarbon amines, cycloaliphatic hydrocarbon amines, cycloaliphatic aliphatic hydrocarbon amines, monocarbocyclic aromatic amines, and heterocyclic amines in which two or three of $R_1$, $R_2$ and $R_3$ are taken together to form a heterocyclic ring, which may include nitrogen, oxygen, and sulfur hetero atoms; $R_1$, $R_2$ and $R_3$, taken singly or together, being hydrocarbon groups having from one to about 30 carbon atoms or hydrogen, the condensation being carried out at a reaction temperature within the range from about 80° to about 150°C, thereby obtaining a cis-Δ³-pseudo ionone or a cis-Δ³-pseudo methyl ionone.

2. A process according to claim 1, in which the reaction time is from 0.2 to about 72 hours.

3. A process according to claim 1, in which dehydrolinalool is condensed.

4. A process according to claim 1, in which dehydrolinalool is condensed with an isopropenyl ether to form pseudo ionone.

5. A process according to claim 1, in which dehydrolinalool is condensed with an isobutenyl ether to form iso and normal pseudo methyl ionone.

6. A process according to claim 1, in which the amount of catalyst is within the range from about 0.1 to about 10% by weight of the reaction mixture.

7. A process according to claim 1, in which the reaction temperature is from 85° to 120°C.

8. A process according to claim 1, in which the metal of the catalyst is copper.

9. A process according to claim 8, in which the metal of the catalyst is chromium.

10. A process according to claim 8, in which the metal of the catalyst is silver.

11. A process according to claim 1, in which the amine of the catalyst is an aliphatic amine.

12. A process according to claim 11, in which the amine is a primary amine.

13. A process according to claim 12, in which the amine is a secondary amine.

14. A process according to claim 12, in which the amine is a tertiary amine.

15. A process according to claim 1, in which the amine of the catlyst is an aromatic amine.

16. A process according to claim 1, in which the amine of the catalyst is a heterocyclic amine.

17. A process according to claim 1, in which M is copper, and

is an aliphatic hydrocarbon amine, wherein $R_1$, $R_2$ and $R_3$ are monovalent hydrocarbon groups having from one to about thirty carbon atoms or hydrogen.

18. A process for preparing $\alpha,\beta$-ethylenic ketones, which comprises condensing a tertiary acetylenic carbinol having the formula:

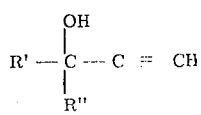

wherein
a. R' is selected from the group consisting of:

(i) 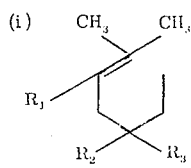

wherein $R_1$, $R_2$ and $R_3$ are selected from the group consisting of hydrogen, lower alkyl and lower alkenyl having from one to about four carbon atoms;

(ii) 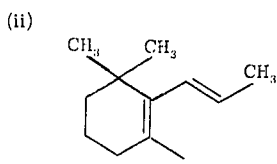

(iii) 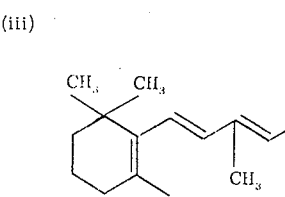

(iv) 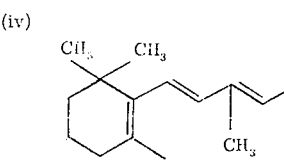

b. R'' is selected from the group consisting of lower alkyl and lower alkenyl having from one to about four carbon atoms; with an isopropenyl or isobutenyl lower alkyl ether in the presence of a metal salt-amine complex catalyst of the formula

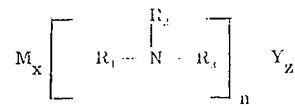

wherein M is a metal selected from the group consisting of copper, chromium and silver, Y is the anion of the salt and is selected from the group consisting of chloride, bromide, iodide, nitrate, and sulphate; $x$ and $z$ are integers selected according to the valence of M and Y, $n$ is a number within the range from about 0.01 to about 50, and

is selected from the group consisting of aliphatic hydrocarbon amines, cycloaliphatic hydrocarbon amines, cycloaliphatic aliphatic hydrocarbon amines, monocarbocyclic aromatic amines, and heterocyclic amines in which two or three of $R_1$, $R_2$ and $R_3$ are taken together to form a heterocyclic ring, which may include nitrogen, oxygen, and sulfur hetero atoms; $R_1$, $R_2$ and $R_3$, taken singly or together, being hydrocarbon groups having from one to about 30 carbon atoms or hydrogen, the condensation being carried out at a reaction temperature within the range from about 80° to about 150°C, thereby obtaining an $\alpha,\beta$-ethylenic ketone.

19. A process according to claim 18 in which M is copper and

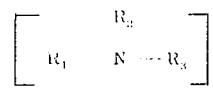

is an aliphatic hydrocarbon amine, wherein $R_1$, $R_2$ and $R_3$ are monovalent hydrocarbon groups having from one to about 30 carbon atoms or hydrogen.

20. A process according to claim 18, in which R' is (i)

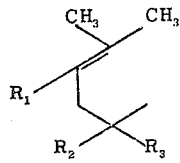

wherein $R_1$, $R_2$ and $R_3$ are selected from the group consisting of hydrogen, lower alkyl and lower alkenyl having from one to about four carbon atoms R'' is lower alkyl.

21. A process according to claim 18, in which the reaction time is from 0.2 to about 72 hours.

22. A process according to claim 18, in which the amount of catalyst is within the range from about 0.1 to about 10% by weight of the reaction mixture.

23. A process according to claim 18, in which the reaction temperature is from 85° to 120°C.

24. A process according to claim 18, in which the tertiary acetylenic carbinol is condensed with an isopropenyl lower alkyl ether.

25. A process according to claim 18, in which the tertiary acetylenic carbinol is condensed with an isobutenyl lower alkyl ether.

* * * * *

PO-1050
(5/69)

UNITED STATES PATENT OFFICE
CERTIFICATE OF CORRECTION

Patent No. 3,886,215          Dated May 27, 1975

Inventor(s) Robert S. DeSimone et al

It is certified that error appears in the above-identified patent and that said Letters Patent are hereby corrected as shown below:

| | | |
|---|---|---|
| Column 10, line 64 | : | after "corresponding" insert --pseudo-- |
| Column 16, line 24 | : | "($\beta$-, $\beta$-, and $\gamma$-)" should be --($\alpha$-, $\beta$-, and $\gamma$-)-- |
| Column 18, line 43 | : | "CR(NO$_3$)$_3$.9H$_2$O" should be --Cr(NO$_3$)$_3$.9H$_2$O-- |
| Column 23, line 41 | : | "methanl" should be --methanol-- |
| Column 24, line 58 | : | "150.0" should be --15.0-- |
| Column 25, line 10 | : | "produce" should be --product-- |
| Column 26, line 5 | : | "container" should be --contained-- |
| Column 27, line 31 | : | "catlyst" should be --catalyst-- |

Signed and Sealed this

*second* Day of *March 1976*

[SEAL]

Attest:

RUTH C. MASON
*Attesting Officer*

C. MARSHALL DANN
*Commissioner of Patents and Trademarks*